United States Patent
LaBonte et al.

(10) Patent No.: US 8,839,499 B2
(45) Date of Patent: *Sep. 23, 2014

(54) METHOD OF MANUFACTURING CONTINUOUS SUCKER ROD

(71) Applicant: Weatherford Canada Partnership, Edmonton (CA)

(72) Inventors: David LaBonte, Edmonton (CA); Ricky Gereluk, Edmonton (CA)

(73) Assignee: Weatherford Canada Partnership, Edmonton, Alberta (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/648,141

(22) Filed: Oct. 9, 2012

(65) Prior Publication Data

US 2013/0140345 A1   Jun. 6, 2013

Related U.S. Application Data

(63) Continuation of application No. 10/518,620, filed as application No. PCT/CA03/00981 on Jun. 27, 2003, now Pat. No. 8,281,472.

(30) Foreign Application Priority Data

Jun. 28, 2002   (CA) .................................... 2390054

(51) Int. Cl.
*B23Q 17/00* (2006.01)
*B23K 37/00* (2006.01)
*B21C 47/24* (2006.01)
*B21C 43/04* (2006.01)
*B21C 37/04* (2006.01)
*B21C 51/00* (2006.01)
*E21B 17/00* (2006.01)
*B23K 31/02* (2006.01)

(52) U.S. Cl.
CPC ................. *B23K 31/02* (2013.01); *B23K 37/00* (2013.01); *B21C 47/247* (2013.01); *B21C 43/04* (2013.01); *B21C 37/045* (2013.01); *B21C 51/00* (2013.01); *E21B 17/00* (2013.01)
USPC .................. 29/407.01; 29/407.05; 29/407.09; 228/234.1; 228/173.5; 219/137 R

(58) Field of Classification Search
USPC ............... 29/407.01, 407.04, 407.05, 407.09; 228/114, 173.5, 231, 234.1; 219/137 R; 72/199, 227, 251, 342.94
See application file for complete search history.

(56) References Cited

U.S. PATENT DOCUMENTS 1,947,969 A * 2/1934 Browne .......................... 29/447
2,281,850 A * 5/1942 McKinney .................... 420/112

(Continued)

FOREIGN PATENT DOCUMENTS

CA   2317291 A1   4/2001
CN   1081490 C    3/2002

(Continued)

OTHER PUBLICATIONS

PCT International Search Report dated Oct. 9, 2003 based on PCT/CA03/00981.

*Primary Examiner* — Essama Omgba
(74) *Attorney, Agent, or Firm* — Patterson & Sheridan, L.L.P.

(57) ABSTRACT

A method for manufacturing a continuous sucker rod coil, wherein the method includes the step of selecting a plurality of input coils, each input coil having the same uniform hardness, and each input coil having two free ends. The method further includes the step of fusing adjacent free ends of adjacent input coils together to form one continuous length of rod, the fusing creating fused areas and a heat-affected zone at each fused area. The method also includes the step of treating each of the heat-affected zones to alleviate irregularities induced during fusing. Additionally, the method includes the step of winding the continuous length of rod into a finished coil.

1 Claim, 3 Drawing Sheets

(56) References Cited

U.S. PATENT DOCUMENTS

| | | | | |
|---|---|---|---|---|
| 2,627,009 | A | * | 1/1953 | Corson et al. ............. 219/104 |
| 2,756,358 | A | * | 7/1956 | Johnson ..................... 310/180 |
| 3,210,838 | A | * | 10/1965 | Nast et al. .................. 228/102 |
| 3,259,959 | A | * | 7/1966 | Tobey ..................... 407/29.12 |
| 3,259,969 | A | | 7/1966 | Tessmann |
| 3,269,248 | A | * | 8/1966 | Nast et al. .................... 83/371 |
| 3,357,458 | A | * | 12/1967 | Radd et al. ................. 138/177 |
| 3,489,620 | A | * | 1/1970 | Current ...................... 148/572 |
| 3,689,326 | A | * | 9/1972 | Polynchuk ................. 148/526 |
| 3,802,061 | A | * | 4/1974 | Teague et al. .............. 228/115 |
| 3,818,173 | A | * | 6/1974 | Zinsser et al. .............. 219/107 |
| 3,828,601 | A | * | 8/1974 | Tessmann .................... 72/334 |
| 3,923,469 | A | * | 12/1975 | Palynchuk .................. 428/611 |
| 3,958,049 | A | * | 5/1976 | Payne ......................... 427/327 |
| 4,045,591 | A | * | 8/1977 | Payne ......................... 427/455 |
| 4,100,782 | A | * | 7/1978 | Clay ............................... 72/53 |
| 4,179,913 | A | * | 12/1979 | Martt ........................... 72/205 |
| 4,462,533 | A | * | 7/1984 | Furr et al. ................... 228/119 |
| 4,468,261 | A | * | 8/1984 | Woodings ................... 148/572 |
| 4,478,652 | A | * | 10/1984 | Woodings ................... 148/337 |
| 4,486,249 | A | * | 12/1984 | Woodings ................... 148/572 |
| 4,588,869 | A | * | 5/1986 | Yoshida et al. .......... 219/76.14 |
| 4,597,688 | A | * | 7/1986 | Pagan ......................... 403/265 |
| 4,655,852 | A | * | 4/1987 | Rallis .......................... 148/518 |
| 4,832,757 | A | * | 5/1989 | Cox et al. ................... 148/598 |
| 4,975,128 | A | * | 12/1990 | Schmitz ...................... 148/520 |
| 5,088,638 | A | * | 2/1992 | Karaev et al. ............ 228/112.1 |
| 5,217,158 | A | * | 6/1993 | Spiegelberg et al. ........ 228/231 |
| 5,324,914 | A | * | 6/1994 | Murray et al. ........ 219/137 WM |
| 5,330,119 | A | * | 7/1994 | Rodriguez et al. ......... 242/559.2 |
| 5,415,209 | A | * | 5/1995 | Candiracci ................... 140/112 |
| 5,895,009 | A | * | 4/1999 | Sato et al. ................... 242/556 |
| 6,145,603 | A | * | 11/2000 | Weaver et al. ............... 175/235 |
| 6,316,937 | B1 | * | 11/2001 | Edens ......................... 324/220 |
| 6,319,101 | B1 | * | 11/2001 | Vago ............................. 451/94 |
| 6,481,082 | B1 | * | 11/2002 | Widney et al. ............ 29/407.01 |
| 6,580,268 | B2 | * | 6/2003 | Wolodko ..................... 324/240 |
| 7,234,627 | B2 | * | 6/2007 | Bostik ....................... 228/234.1 |
| 8,281,472 | B2 | * | 10/2012 | Labonte et al. ........... 29/407.01 |
| 2001/0045420 | A1 | * | 11/2001 | Bong et al. ................ 219/125.1 |
| 2004/0056076 | A1 | * | 3/2004 | Bostik ....................... 228/234.1 |
| 2004/0064929 | A1 | * | 4/2004 | Yokabitus et al. ............. 29/417 |
| 2008/0196235 | A1 | | 8/2008 | Gereluk |

FOREIGN PATENT DOCUMENTS

| | | | |
|---|---|---|---|
| GB | 2446717 A | | 8/2008 |
| JP | 60238418 A | | 11/1985 |
| JP | 05009561 A | * | 1/1993 ............... C21D 1/30 |
| JP | 2002239627 A | | 8/2002 |
| WO | 2004002644 A1 | | 1/2004 |

* cited by examiner

Prior Art Manufacturing Layout

METHOD OF MANUFACTURING CONTINUOUS SUCKER ROD

This application is a continuation of U.S. patent application Ser. No. 10/518,620, filed Jan. 20, 2006, now U.S. Pat. No. 8,281,472, which is herein incorporated by reference.

BACKGROUND OF THE INVENTION

1. Field of the Invention

This invention relates to a simplified method and apparatus for manufacturing continuous sucker rods.

In oil and gas wells, a "drive string" connects the pump, located down hole, to the drive system, located at the surface. Conventional sucker rods are elongated steel rods, 20 feet to 30 feet in length. Traditional drive string typically consisted of a sequence of conventional sucker rods with connecting mechanisms at each end of each conventional sucker rod which permit end-to-end interconnection of adjacent rods. In contrast, continuous sucker rod is a unitary rod, consisting of one elongated continuous piece of steel. Thus, continuous sucker rod does not have the numerous interconnection points found in the interconnected conventional sucker rods. Each interconnection point between two successive conventional sucker rods is a source of potential weakness and excess wear on the adjacent tubing and casing. However, increased costs can be associated with continuous sucker rod.

The length of a drive string can vary from anywhere from as little as 500 feet to as much as 10,000 feet or more, depending on the depth of the well and desired location of the pump down hole. Continuous sucker rod is typically produced and stored for sale on large transport reels. These transport reels have a maximum diameter of about 19 to 20 feet and the diameter may be as small as 9-10 feet. (The desired maximum diameter is limited by transport issues). A full reel can carry continuous sucker rod with lengths of over 6,000 feet depending on the diameter of the rod.

The properties of the steel used for any drive string sucker rod, whether continuous or conventional sucker rod depend upon the conditions of the well and the drive system and pumping system used to produce the well. Sucker rod is generally classified into grades which are suitable over a range of load conditions and/or environmental conditions, such as $H_2S$ content of the well. The design of continuous sucker rod must be such that the continuous sucker rod can be wound tightly enough to fit snugly on the transport reel and then be able to be straightened into a drive string at the well, without sacrificing the desired properties for the load and environmental conditions of the intended use. Winding the continuous sucker rod onto transport reels sometimes causes permanent deformation as the rod is wrapped onto the transport reel and then straightened in the field for use.

Palynchuk, Canadian Patent No. 942,585 discloses one of the original methods of manufacturing continuous sucker rod. In Palynchuk, continuous sucker rod was made by taking a series of input coils, joining the ends of the coils together, and subjecting the joined coils to a series of treatment steps. The coils were also hot worked from a round cross-section to oval cross-section along the entire length of the continuous sucker rod. The oval cross-section permitted the continuous sucker rod to be wrapped on the transport reel in the direction of its minor diameter which reduced the extent of permanent plastic deformation in the continuous sucker rod. Oval cross-sectional continuous sucker rod is generally used with reciprocating pump applications.

Heavy oil wells are most often produced with progressive cavity pumps ("PC Pumps"). PC Pumps are driven by a rotary drive and consequently, the drive string used in these applications also rotates. Oval cross-section sucker-rod is not suitable for rotating drive string applications due to the eccentric loads encountered during rotation and greater wear caused along the tubing. Also, the effects of plastic deformation on sucker rod performance are less of a concern with rotating drive strings because the loads are torsional and the rotating drive strings are not subjected to the cyclical high compression/tension loads experienced in the reciprocating pump applications. Therefore, expensive oval cross-section continuous sucker rod, such as that disclosed by Palynchuk, is not generally used for rotary drive applications. Round cross-sectional sucker rod and continuous sucker rod, is more suitable.

Steel used to make continuous sucker rod is received from the steel mill in raw coils. The steel is manufactured by the steel mill to meet specifications as directed by the sucker rod manufacturer. Steel manufactured to ASTM standard A576 and supplementary requirements S7, S8, S11, S12 and S18 is known to produce suitable sucker rod for most oil and gas applications. To meet these requirements, the input coils are specially alloyed using known techniques to produce a grade of steel with suitable hardenability, strength, toughness, corrosion resistance, fatigue resistance, micro-cleanliness, and weldability.

However, the hardness and corresponding tensile strength of the steel coils received from the mill in raw form is inconsistent, highly variable along individual coils and from coil to coil, and relatively low. Since tensile strength is one of the most critical requirements for all sucker rod, it is necessary for the entire length of the steel coils to be subject to treatment during the manufacture of the continuous sucker rod to ensure that the critical tensile strength requirements are met and are uniform along the length of the continuous sucker rod. Input coils received from the steel mills in prior art practices are generally of very low hardness due to the chemistry and manufacturing processes used in the steel mill.

Usually, a number of the raw coils must be fused together end-to-end to form one continuous sucker rod of the desired length. The ends are usually fused together by welding which creates heat-affected zones adjacent to the welded area which must be treated to relieve stresses and yielding caused by the welding process. Without such treatment, the heat-affected zones would be a source of potential weakness which could cause failure of the continuous sucker rod in use.

Prior art methods treat the entire length of the rod with a series of austenizing, quenching, and tempering treatment steps which produce a final continuous rod which is of consistent hardness and strength and which also alleviate the problems induced by the welding in the heat-affected zone. The rod must be straightened and many of these steps are to be applied along the entire length of the rod. Usually, two or three successive production lines are required to subject the continuous sucker rod to all of the necessary steps, with the rod being uncoiled, straightened, treated as it passes through each line, coiled, transferred to the beginning of the next line, uncoiled and straightened to pass through the next line, and so on.

These prior art methods of manufacturing continuous sucker rod therefore require extensive heavy, permanent equipment and a large fixed facility to practice the method within. Steps such as ambient cooling necessitate a long open space within the manufacturing facility to permit the length of rod to be exposed for the requisite period of time and some present facilities in which the prior art methods are practiced can be as long as 300 feet or more. As a result, these prior art methods involve significant capital investment.

Recent methods have sought to reduce this capital investment by using 40 foot rods transported directly to the well site and fusing them together with a "portable" plant at the well site itself (see Widney et al, CA P 2,317,291). Such methods are disadvantageous in that they are highly labour intensive at remote locations.

What is needed then is a method of manufacturing continuous sucker rod which reduces the number of treatment steps required to be performed without sacrificing essential properties required to make the rod suitable for load and environmental conditions as specified. It would also be preferable to have a method which permits reduced capital investment into equipment and facilities, thereby reducing costs.

2. Description of the Related Art

SUMMARY OF THE INVENTION

The present invention satisfies the aforementioned needs of continuous sucker rod manufacturers as well as other needs.

A method of manufacturing a continuous sucker rod coil is provided which comprises the steps of: (a) selecting a plurality of input coils, each input coil having the same uniform hardness, and each input coil having two free ends; (b) fusing adjacent free ends of adjacent input coils together to form one continuous length of rod, said fusing creating fused areas and a heat-affected zone at each fused area; (c) treating each of said heat-affected zones to alleviate irregularities induced during fusing; (d) winding said output coils into a finished coil.

The method can alternatively be comprised of the steps of: (a) selecting one or more input coils each with the same consistent hardness, each input coil having two free ends; (b) inspecting said input coil for flaws; (c) marking said flaws; (d) removing said flaws creating further free ends in said input coil; (e) fusing adjacent free ends together to form one continuous length of rod, each of said fusing creating a fused area and a heat-affected zone at each fused area; (f) treating each of said heat-affected zones to alleviate irregularities induced during fusing; (g) winding said output coils into a finished coil.

This method eliminates heavy equipment and reduces space and time requirements thereby reducing capital costs and providing a transferable facility.

DETAILED DESCRIPTION

Figure 1:
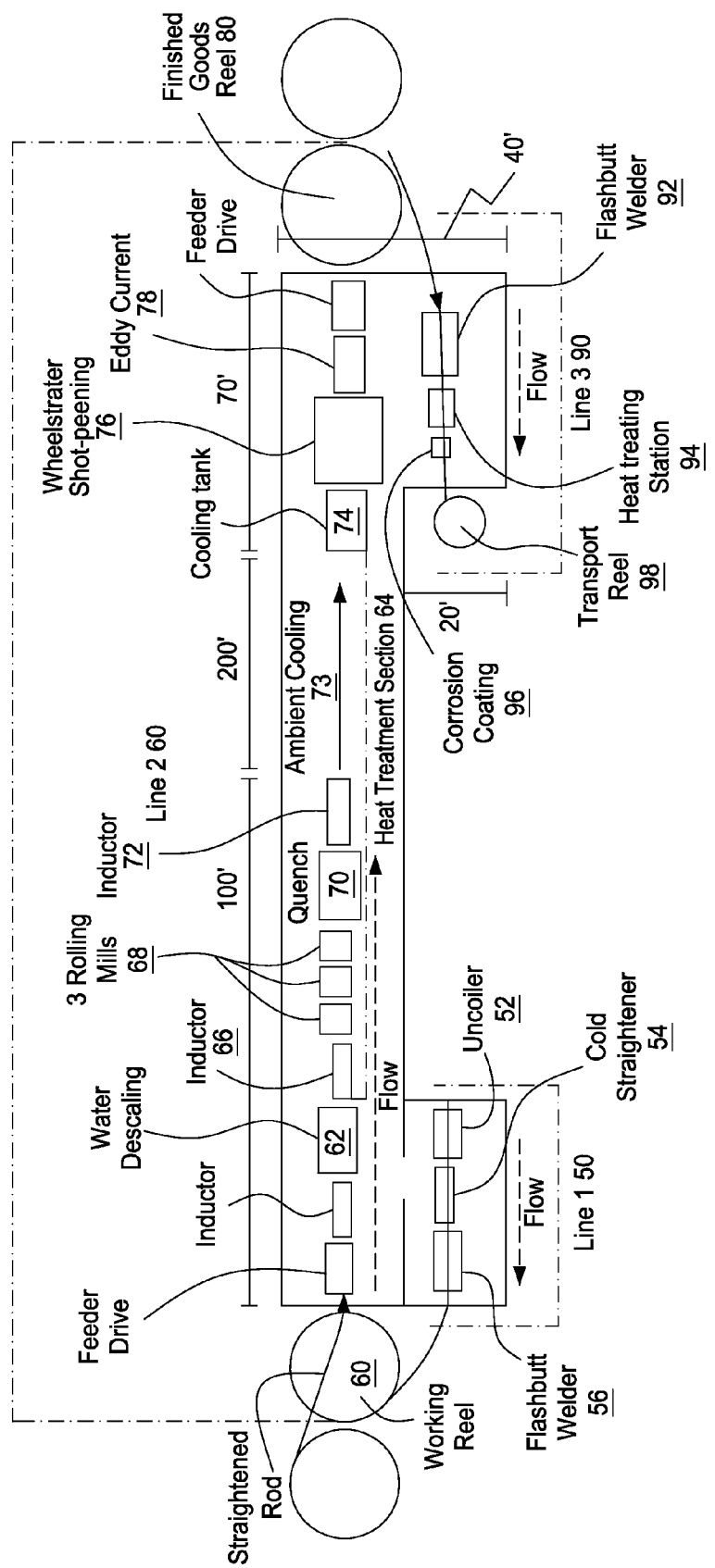
FIG. 1 is a schematic of a method for manufacturing continuous sucker rod known in the prior art.

The prior art method shown in FIG. 1 is an illustration of the steps involved in a prior art method where the steel from the steel mill is selected without specifying a requirement of a uniform tensile strength along and among the input coils to be used to produce the continuous sucker rod. Referring now to FIG. 1, there are three lines in this method—Line 1 (50), Line 2 (60) and Line 3 (90).

On Line 1, the steel coil from the steel mill (not shown) is uncoiled by an uncoiler (52), then straightened by a straightener (54) and then passed through a first flash-butt welding section (56). Welding in the first flash-butt welding section (56) is applied only to the ends of the steel mill coils to fuse one end of one coil to the end of the next coil to form one continuous elongated piece of steel. After passing through the flash-butt section, the steel is transferred to a large working reel (58) to be held until production on Line 2 is initiated.

On Line 2 (60), the steel is rolled off of the working reel (58), and first passes through a water descaling section (62), then through a heat treatment section (64). The heat treatment section (64) includes an inductor (66) for austenizing the rod, rolling mills (68) for rolling to reduce the cross-section of the rod if necessary, a quenching section (70), a second inductor (72) for heating, and an ambient cooling section (73) and cooling tank (74) for cooling. The purpose of the steps in the heat treatment section (64), apart from the rolling mills (68), is to cause the steel to undergo the structural transformations at the atomic level that create the critical uniform hardness and resulting tensile strength required for the specified load and environmental conditions in the field. As can be seen in the FIG. 1, the heat treatment section (64) itself includes a number of pieces of heavy equipment and requires a significant amount of space. After passing through the heat treatment section (64), the steel continues on Line 2 through a shot-peening section (76) and an eddy current section (78) for flaw detection and then is transferred to a finished goods reel (80).

On Line 3 (90), a number of finishing steps are performed, including removal of flaws that have been identified on Line 2. Line 3 (90) includes a flash-butt welder (92), mini-heat treating station (94) and a corrosion coating section (96). After completion in Line 3, the continuous sucker rod is transferred to a transport reel (98) for transport as directed by the customer.

Figure 2:
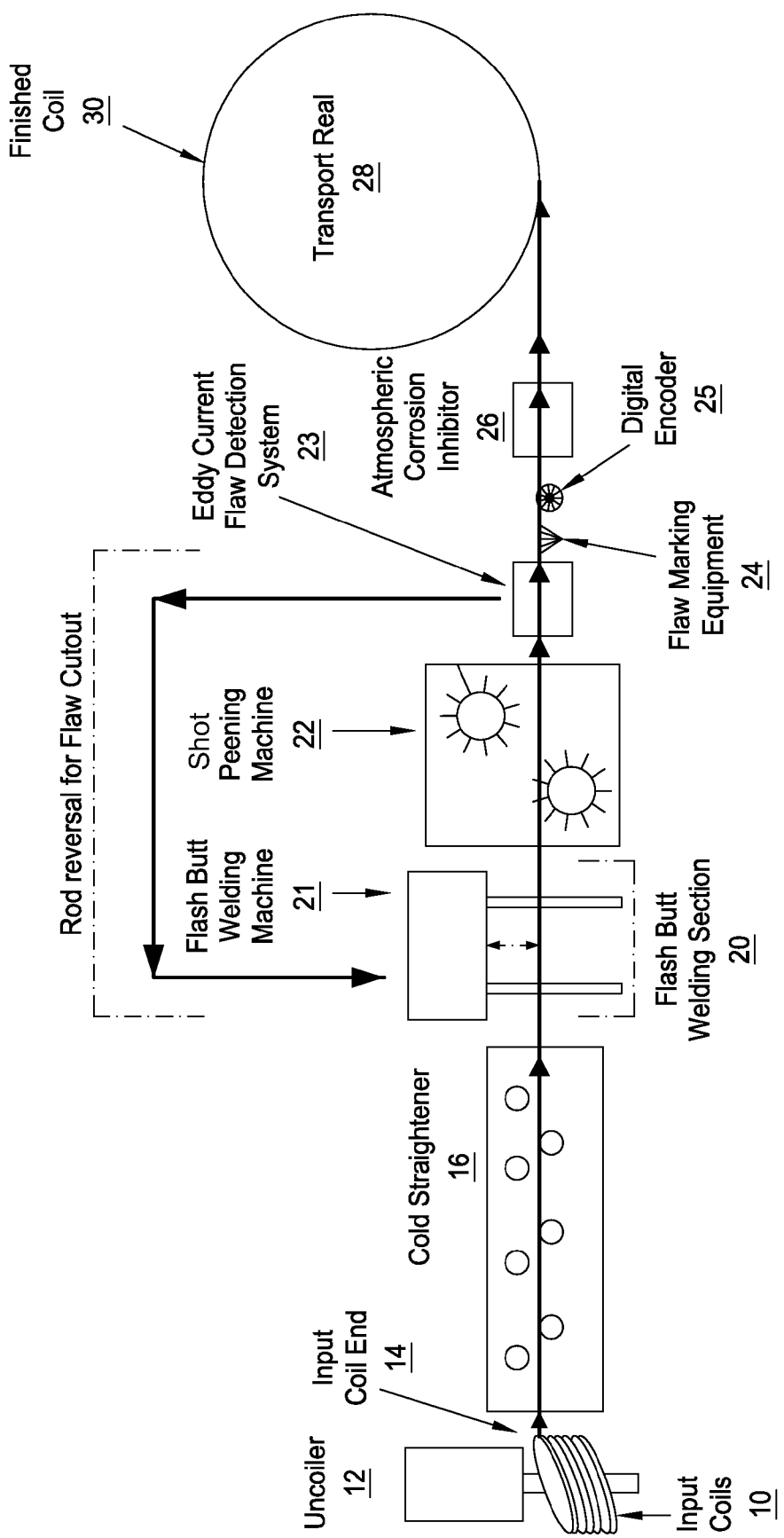
FIG. 2 is a schematic of the method of manufacturing in accordance within the present invention; and, FIG. 3 is a schematic of an alternative embodiment of method of manufacturing in accordance with the present invention.

Referring now to FIG. 2, the preferred embodiment of the manufacturing method in this invention is described below.

The method begins with the selection of the material for the input coils (10) which is a critical step. The input coils (10) are received from the steel mill in hot rolled condition of desired diameter and specified cross-section, such as round cross-section. The input coil (10) is of a composition known to be suitable for sucker rod. Preferably, the input coils (10) are hot rolled steel manufactured as Special Bar Quality as specified in ASTM A576 and supplementary requirements within ASTM A576—S7, S8, S11, S12 and S18 to meet known requirements for steel that will perform well as sucker rod, but other standards and specifications known to produce suitable sucker rod could also be used. However, in this invention the selection of the raw material for the input coils (10) includes an additional requirement—the as-rolled hardenability characteristic of the input coils (10) must be uniform longitudinally and cross-sectionally along and among the input coils to be joined together and be at a specified limit within a specified range to ensure uniform minimum tensile strength. This differs from the prior art where uniform hardness and corresponding tensile strength within a specified range or limits for the input coils (10) are not specified.

Conveniently, the input coils (10) can be selected to correspond to a number of grades as per current industry practice to provide reasonable product variation. The number of grades and corresponding ranges are matters of choice depending on convenience of providing multiple grades (a production and inventory issue). The choice of grade will depend on the particular application the drive string is to be used for.

The minimum tensile strength required for any given applications will be governed by the maximum load conditions expected to be encountered in use. Since it is well-known that exposure to $H_2S$ causes failure of steel sucker rod when hardness exceeds a certain limit, potential exposure to H$_2$S provides a maximum upper limit on the permitted hardness, and therefore the maximum tensile strength of the sucker rod, if the sucker rod is to be used in H$_2$S service. Costs, which typically increase with higher strength rod, are also a consideration.

The hardness and tensile strength specified for the input coils can be achieved by the addition of known alloying elements, such as Boron, Chromium, and the like, in accordance with known techniques. The choice of the alloying elements and the methods to be used will be dictated by the individual steel mill facility and its process which are the source of the input coils. Previously, the steel mills producing input coils for prior art methods did not need to include these considerations in the production of the input coils because consistent hardness and corresponding tensile strength of the input coils were not specified as requirements. Of course, the alloys chosen and techniques used must not unduly affect other desired properties for suitable sucker rod as specified.

Hardenability gauges the propensity of a steel to harden in depth and breadth. Hardening of steel is facilitated by cooling steel rapidly from a critical temperature. Hardening is achieved by the addition of elements which promote hardening, such as Carbon, Manganese, Chromium, Nickel and -Boron. Carbon and Manganese-are-common due to cost effectiveness. Recently developed "micro-alloyed" steels use Titanium, Vanadium and Columbian in very small quantities. Hardness ensures strength which is a key design parameter in the design of a rod string. The material hardness (strength) of continuous sucker rod needs to provide adequate resistance to imposed stresses.

Ultimate Tensile Strength (UTS) is the highest load the material will bear. UTS is proportional to hardness and is achieved in the same way as hardenability. Yield strength is the elastic limit of the material. Yield strength is a characteristic of the micro-structure of the rod and two materials with the same UTS but different micro-structure may exhibit different yield strength. Alloying the material will enhance the formation of a micro-structure which will exhibit a higher UTS/yield strength ratio. Micro-alloying elements may be used to gain both types of strength and the ratio between them. Continuous sucker rods are subjected to relatively high loads and therefore a suitably high UTS material should be used. A material with a higher UTS/yield strength ratio will result in a tougher rod (in the sense of requiring more energy to fail) and may exhibit better fatigue properties.

Steel is made up of grains on a microscopic level. Finer grained steels are tougher and stronger than coarse grained steels. There are a wide variety of methods to achieve fine grained steels. Alloying has been used in this invention to inhibit grain growth, although there is no data to indicate that such method is preferred. Hot rolling Carbon-Manganese steels micro-alloyed with Vanadium at lower rolling temperatures will enhance grain size. Finer grains will provide enhanced toughness and fatigue resistance and will exhibit less tendency to fail along grain boundaries.

Where flash-butt welding is anticipated as part of the overall method of manufacturing, Carbon is an unfavourable choice of hardening element due to the possibility of embrittlement or decarburization during the flash-butt welding process which could lead to an undesirable weak or brittle weld joint. A Vanadium enhanced Carbon-Manganese steel has therefore been tested in accordance with this invention. Such a steel provides strong welds with properties more uniform to the parent rod.

Fatigue loading is the application of repeated load over an extended period of time where the load is well under the tensile strength of the material. Fatigue failures are progressive and often start from a surface flaw. After a number of load reversals, a crack may initiate and propagate through the cross-section. Micro-alloying, rolling practices and heat treatment may enhance fatigue properties. Vanadium additions may lead to a fine grained steel with enhanced fatigue properties. Continuous sucker rod often-fails in fatigue mode. Enhanced fatigue resistance will therefore tend to increase the service life of the rod.

Different steels will corrode at different rates when subjected to corrosive environments. Typical oil well corrosion is via electro or chemical mechanisms. Alloying is also frequently used to create materials with enhanced corrosion resistance in the oilfield environment. Carbon-Manganese based steel is one material generally accepted in the industry as being suitable for the oilfield environment. Reasonable corrosion resistance will enhance the service life of the continuous sucker rod.

Testing and field trials have been conducted using a Carbon-Manganese Steel micro-alloyed with Vanadium and Niobium obtained from Stelco Inc. of Hamilton, Ontario, Canada identified as 1.031 Grade X.

Once input coils are selected in accordance with the requirements, the remainder of the method of the preferred invention is enabled.

Referring again to FIG. 2, an input coil (10), selected and received from the steel mill in accordance with the above requirements, is set into the staging area of the processing facility for a pre-processing inspection. The input coil (10) is visually inspected for surface flaws and bends. If these flaws are found to be outside of specifications, they are to be marked for subsequent cut-out or re-work. If the density of the flaws is severe, the input coil (10) may be scrapped prior to processing.

The input coil (10) is placed on the mandrel of an uncoiler (12) and the steel shipping bands (not shown) are removed. The uncoiler (12) supports the input coil (10) during the uncoiling operation and facilitates the orderly uncoiling of the raw material without tangling and kinking. The uncoiler (12) is used to uncoil the input coil (10) in a known manner.

After uncoiling, the rod passes through a two axis, multi-roll rod straightener (16) which performs a cold straightening operation. Preferably, the coiled steel material is straightened dynamically in the vertical and horizontal axis such that even relatively high yield strength material is successfully straightened to an industry standard, such as API 11B for example, (which is, for a gauge length of 12 inches, the maximum allowable bend is 0.065" or 0.130" total indicated runout (TIR)). The straightener (16) acts to straighten and propel the rod forward in a known manner, yielding the rod in the opposite direction to the bend of the steel in it's coiled as received form in the input coil (10). Proper straightening of the rod during manufacture prevents the rod assuming a "wavy" form after being wound onto the transport reel and then off the transport reels to form a drive string in the field. Although wavy rod will perform under some conditions, straight rod is generally required by customers and is a more desirable and marketable product.

Upon leaving the straightener (16), the rod is passed through a flash-butt welding section (20). The flash-butt welding section (20) includes an automatic flash-butt welding machine (21). Each input coil (10) will have a free end at the beginning and at the end of the coil. Additional free ends within the input coil (10) will be created when a flaw marked for cut-out is cut out (discussed below). The cut-out is performed using a shear or cutting torch (not shown). The flash-butt welding machine (21) is used to fuse adjacent free ends of the input coil ends (14) together to form one continuous rod, whether those free ends are adjacent ends from either side of a flaw cut-out or from adjacent free ends of one input coil to the next input coil in the series.

Flash-butt welding fuses the free ends together in the following manner. Adjacent free ends are clamped in an axially opposing manner by two electrodes of opposite electrical polarity. One electrode is fixed while the other moves in the axial direction. When the electrodes are energized, the rod becomes the electrical conductor of a high current. The electrical current flowing through the rod is converted to heat due to the electrical resistance of the rod. The rod ends heat to the melting temperature of steel for a brief period before they are rapidly forced together under the action of the moveable electrode. The fusing process of the welding creates a fused area and a heat-affected zone. The heat-affected zone typically extends throughout the fused area and 1 to 2 inches on either side of the fused (welded) area. The welded rod is held in the upset position briefly while the heat-affected zone of the fused area cools. Upon cooling, the electrodes are unclamped and the heat-affected zone is ground and polished to meet rod body dimensional specifications.

After cooling, the heat-affected zone adjacent each weld must be treated to alleviate imperfections induced by the flash-butt welding. This treatment occurs in the flash-butt welding section (20). The heat-affected zone is reclamped in the electrodes of the flash-butt welding machine (21) and tempered for stress relieving in a known manner. As an example, the heat-affected zone may be heated to 560.degree. C., a temperature well below Ac1 (the temperature at which austenite begins to form during heating) held for a stress relieving time of approximately 30 seconds, after which the heat-affected area is air-cooled in ambient conditions. Stress relieving ensures the weld area is made free of residual stresses induced during the weld process. After the stress relieving process is complete, all welds are inspected for cracking and incomplete fusion using a standard magnetic particle examination procedure.

After the flash-butt welding of the free ends is complete, the fused rod is transferred out of the flash-butt welding section (20).

Though not necessary in all applications, the rod exiting the flash-butt welding section (20) is preferably immediately fed through a multi-wheel shot-peening apparatus (22). The shot-peening apparatus (22) removes the iron oxide covering the steel and mechanically peens the outside surface of the rod. Sucker rods commonly fail under a fatigue mode of failure due to the propagation of tiny surface defects, notably cracks. Since cracks will only propagate under tensile stress, the crack tips will not open further if a net compressive stress remains on the crack tip as induced by shot-peening and therefore the continuous sucker rod life is extended and improved fatigue resistance due to the induced compressive stress on the rod surface is achieved. As well, mill scale covering on the raw steel may offer a preferential site for the start of crevice corrosion if not removed. Crevice corrosion is a localized form of corrosion associated with small volumes of stagnant solution, in this case, pockets created by the loosely attached mill scale. Shot-peening also effectively removes the mill scale and ensures a clean surface, free of areas susceptible to preferential corrosion. However, it is to be understood that other methods of cleaning the mill scale and/or placing the surface of the rod into compression may be used and that the enhanced crack resistant product resulting from shot-peening, although is an improved product, is optional.

After exiting the shot-peening operation, the rod is then, optionally, surface inspected using an on-line eddy current flaw detector (23). If sufficiently significant, the flaws are marked with flaw marking equipment (24) for cut-out. Alternative known means of flaw detection are also available. However, eddy current inspection is preferred due to its repeatable results and relative ease of application to continuous inspection.

As each flaw is marked and identified, the rod is stopped and backed up to the flash-butt welding section (20). A shearing or cutting torch located in the flash-butt welding section (20) is used to cut out the flaws, creating two new free ends which must be fused together using the flash-butt welding machine (22) in the same manner that the free ends of the coils were fused. The new weld will then pass through the shot-peening apparatus (22) and the eddy-current flaw detector (23) to be re-inspected.

It will be apparent that the rod will run continuously through the uncoiler (12) and the straightener (16) and will not be stopped as it passes through the flash-butt welding section (20) the first time unless a free end of the input coil (10) is encountered. The free end of one input coil (10) will be fused to the adjacent free end of the next input coil (10) in series which will have passed through the uncoiler (12) and the straightener (16) in the same manner as the input coil before it. Rod passing freely through the flash-butt welding section (20) will continue to pass continuously through the shot-peening apparatus (22) and the eddy current flaw detector (23). If, however, a flaw is marked for cut-out during the flaw detection by the eddy current flaw detector then, the process must be stopped, and the rod backed up to place the flaw at the beginning of the flash-butt welding section (20) where the flaw is removed as described above, creating two further adjacent free ends which must then be welded by the flash-butt welding machine (20) creating heat-affected zones which are treated as described above. After that, the rod begins to run continuously again so that the fused area and heat-affected zone (where the weld was) pass through the shot-peening apparatus (22) and are themselves inspected for flaws with the eddy current flaw detector (23). Backup to the flash-butt welding section (20) can be repeated if further flaws, in the fused area and heat-affected zone or elsewhere along the rod, are detected. Otherwise, the rod will pass to the next section.

The steps of inspecting and marking for flaws and then backing up the rod for removal of those flaws, although preferable, are optional.

The rod is accurately measured linearly upon exit of the process by means of wheel mounted digital encoder (25) running on the moving rod, or other suitable device. Accurate length measurements ensure individual rod strings are to customer's requirements and bulk reels of rod comply with road transportation weight limits.

After measurement, the rod is driven through a bath of atmospheric corrosion inhibitor (26), which prevents the rusting of the continuous sucker rod while stored in inventory. The inhibitor is pumped over the moving rod and the excess coating is wiped away prior to exiting the coating enclosure. The coated rod is then guided through a series of rollers which wind the rod onto transport reel (28) into a finished coil (30) for storage in inventory and safe shipment to the field well site.

The finished coil (30) has a specified limit or range of yield strength. The finished coil (30) is suitable for use as drive string for rotary pump applications where the specified yield strength is sufficient to meet the maximum load conditions expected to be experienced in use. The finished coil (30) may also be suitable for use in reciprocating pump applications where fatigue resistance is of minimal concern.

In an alternative embodiment, it may be possible to avoid backing up the rod to before the flash-butt welding section (20) after flaw identification at the eddy current flaw detector (23) occurs by placing an additional flash-butt welding section immediately after the eddy current flaw detector (23). In this case, free ends of adjacent input coils would be joined at the flash-butt welding section (20) while cutting out the flaws and fusing the further free ends that are formed by the cutting out process would occur in the second flash-butt welding section. In this embodiment, the fused areas formed in the second flash-butt welding section would not be shot-peened or themselves inspected for flaws.

Figure 3:
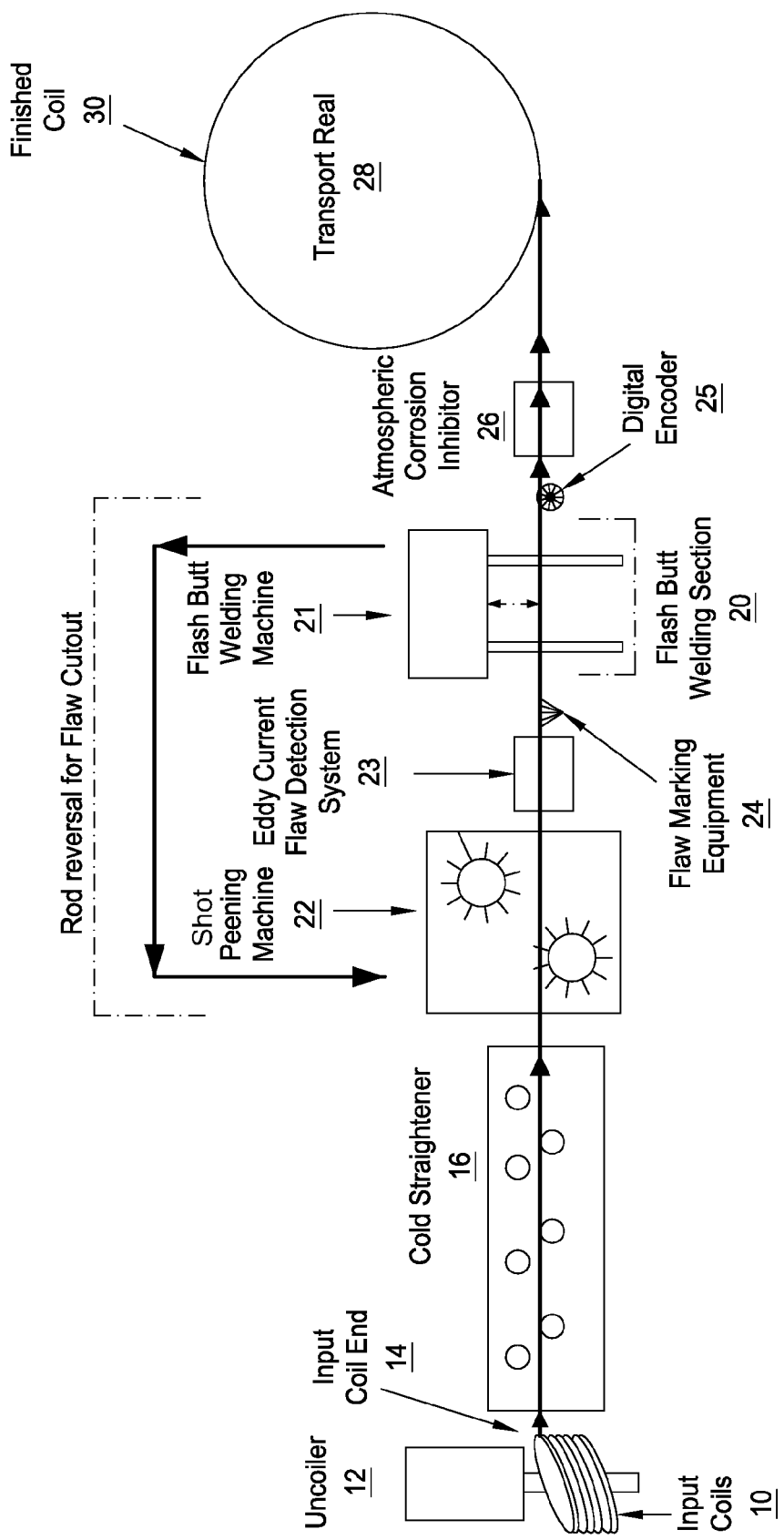

In another alternative embodiment, it may be possible to place the shot-peening apparatus (22) and the eddy-current flaw detector (23) before the flash-butt welding section (20). This is illustrated in FIG. 3. However, if the welds are also to be shot-peened and inspected (preferable), the rod would have to be backed up prior to both operations in order for the heat-affected zone of the weld to be subjected to these treatment steps.

It will be apparent from the previous description that the current invention provides a number of distinct advantages over previous methods of manufacturing continuous sucker rod. The method of the invention differs from previous methods for manufacturing continuous sucker rod where the input coil is received in raw form with variable strength and hardness and where the desired consistency in strength and hardness is provided by the series of austenizing, quenching, and tempering steps applied to the entire rod (as demonstrated from Line 2 in FIG. 1 of the prior art process). By selecting an input coil with the desired tensile strength and uniform hardness characteristics, complicated, expensive, and time-consuming steps need not be applied to the length of the entire rod. Instead, a more limited tempering and cooling process is applied to the heat-affected zone of the welds for more limited purposes. Since the heat-affected zone is limited to 1 to 2 inches on either side of each weld, only a few feet in total must be treated, as opposed to the entire length of the continuous rod and the treatment steps for the heat-affected zone are relatively simple and quick. As well, less labour per foot of rod manufactured is required.

Thus, the equipment required to practice this method is significantly less cumbersome and fixed than that needed for previous methods. Only one production line is required. Only one flash-butt welding machine is required. Only one uncoiler and straightener is used. There is no need for a long open air area for ambient cooling of significant lengths of rod, thus required length of the facility is greatly reduced. There is no need for any of the heavy equipment used in the austenizing, quenching and tempering steps.

Consequently, the size and length of the facility can be significantly reduced. Furthermore, all of the equipment required to practice the method could be encompassed in a set of trailers, allowing for transfer of the equipment to permit performance of the manufacturing method in different locations, including the field itself if desired. Thus, the simplified facility could be transferable instead of fixed in a permanent structure. Even if practiced within a permanent structure, the location of the facility could be transferred with a relatively low degree of difficulty.

Thus, there is a significant reduction in the capital investment required for the equipment and facilities used to perform this manufacturing process. It is estimated that the capital costs could be as much as 90% lower than current costs.

Immaterial modifications may be made to the invention described here without departing from the essential characteristics of the invention. For example, it is not necessary to include ASTM standard A576 and any or all of its supplementary requirements S7, S8, S11, S12 and S18, provided material suitable for use as sucker rod is chosen. As well, alternate methods of welding can be used. So too, alternate methods of placing the surface into compression and removing mill scale can be used in place of shot-peening and alternate flaw detection methods can be used in place of eddy-current detection. As mentioned, it may not be necessary to straighten the rod during the process for some cases, but generally straightening results in a better performing, more marketable product. Similarly, it may not be necessary to include the shot-peening and/or flaw detection and removal steps but both will enhance the quality of the final product. Although the rod contemplated in the preferred embodiment is of round cross-section, it will be understood that other cross-section could be specified for the input coil and would be received from the steel mill in the desired cross-section.

While the foregoing is directed to embodiments of the present invention, other and further embodiments of the invention may be devised without departing from the basic scope thereof, and the scope thereof is determined by the claims that follow.

The invention claimed is:

1. A method of manufacturing a continuous sucker rod coil, the method comprising:
   selecting a plurality of input coils, each input coil having the same uniform hardness, and each input coil having micro-alloying elements that enhance formation of a micro-structure which exhibits a higher Ultimate Tensile Strength/yield strength ratio;
   fusing adjacent input coils together to form one continuous length of rod, wherein fusing creates a heat-affected zone at each fused joint; and
   treating each of the heat-affected zones to alleviate irregularities induced during fusing.

\* \* \* \* \*